(12) United States Patent
Bialer et al.

(10) Patent No.: US 12,110,013 B2
(45) Date of Patent: Oct. 8, 2024

(54) PREDICTION OF PEDESTRIAN ROAD CROSSING WITH VEHICLE SENSOR

(71) Applicant: GM GLOBAL TECHNOLOGY OPERATIONS LLC, Detroit, MI (US)

(72) Inventors: Oded Bialer, Petah Tivak (IL); Siddhartha Gupta, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 258 days.

(21) Appl. No.: 17/961,885

(22) Filed: Oct. 7, 2022

(65) Prior Publication Data

US 2024/0116503 A1    Apr. 11, 2024

(51) Int. Cl.
*B60W 30/00*      (2006.01)
*B60W 30/095*   (2012.01)
(Continued)

(52) U.S. Cl.
CPC ......... *B60W 30/0956* (2013.01); *G01S 7/415* (2013.01); *G01S 13/52* (2013.01); *G01S 13/867* (2013.01); *G01S 13/931* (2013.01); *B60W 2420/403* (2013.01); *B60W 2420/408* (2024.01); *B60W 2554/4029* (2020.02); *B60W 2554/4044* (2020.02); *B60W 2554/4045* (2020.02); *B60W 2554/801* (2020.02); *B60W 2556/40* (2020.02); *B60W 2720/106* (2013.01); *B60W 2720/24* (2013.01); *G01S 2013/9318* (2020.01); *G01S 2013/93185* (2020.01)

(58) Field of Classification Search
CPC ....... B60W 30/0956; B60W 2420/403; B60W 2420/408; B60W 2554/4029; B60W 2554/4044; B60W 2554/4045; B60W 2554/801; B60W 2556/40; B60W 2720/106; B60W 2720/24; B60W 30/09; B60W 30/00; G01S 7/415; G01S 13/52; G01S 13/867; G01S 13/931; G01S 2013/9318; G01S 2013/93185; G01S 13/58; G01S 13/865; G01S 17/931; G01S 13/42; G01S 7/4802; G01S 17/46; G01S 17/86
USPC .......................................................... 701/26
See application file for complete search history.

(56) References Cited

U.S. PATENT DOCUMENTS 9,290,174 B1 * 3/2016 Zagorski ............... B60W 30/18
11,150,660 B1 * 10/2021 Kabirzadeh ............ G06F 30/15
(Continued)

*Primary Examiner* — Shardul D Patel
(74) *Attorney, Agent, or Firm* — Quinn IP Law

(57) ABSTRACT

A system of controlling operation of a vehicle includes one or more sensors operatively connected to the vehicle. The sensors are configured to obtain respective data of a scene and include a radar unit. A command unit is adapted to receive the respective data and includes a processor and tangible, non-transitory memory on which instructions are recorded. The command unit is configured to determine an orientation angle of a pedestrian in the scene, a Doppler frequency of the pedestrian and a distance of the pedestrian from a border of a road, based in part on the respective data. The orientation angle is based on a heading of the pedestrian relative to a direction of a road. The command unit is configured to designate a status of the pedestrian as either crossing or not crossing based on the distance, the orientation angle and the Doppler frequency of the pedestrian.

20 Claims, 3 Drawing Sheets

(51) Int. Cl.
    *G01S 7/41*          (2006.01)
    *G01S 13/52*        (2006.01)
    *G01S 13/86*        (2006.01)
    *G01S 13/931*      (2020.01)

(56) References Cited

U.S. PATENT DOCUMENTS

| | | | |
|---|---|---|---|
| 11,200,429 B1* | 12/2021 | Evans | G06V 10/62 |
| 11,409,304 B1* | 8/2022 | Cai | B60R 1/00 |
| 2021/0142526 A1* | 5/2021 | Mantyjarvi | B60W 50/14 |
| 2021/0341921 A1* | 11/2021 | Davis | G05D 1/0212 |

* cited by examiner

PREDICTION OF PEDESTRIAN ROAD CROSSING WITH VEHICLE SENSOR

INTRODUCTION

The present disclosure relates to prediction of a pedestrian crossing a road using one or more sensors on a vehicle. Mobile platforms, such as motor vehicles, encounter other moving and non-moving objects as they journey through space and time. For example, a vehicle may encounter pedestrians, both moving and standing still. Predicting the behavior of pedestrians is not a trivial matter. In terms of model-based methods, it is difficult to construct explicit mathematical models to describe the probability of a pedestrian crossing a road. For data-driven methods, it is challenging to gather large datasets that capture the randomness of pedestrian crossing behavior and interdependence on other factors.

SUMMARY

Disclosed herein is a system of controlling operation of a vehicle in real-time. The system includes one or more sensors operatively connected to the vehicle. The sensors are configured to obtain respective data of a scene and include a radar unit. A command unit is adapted to receive the respective data and includes a processor and tangible, non-transitory memory on which instructions are recorded. The command unit is configured to determine an orientation angle of a pedestrian in the scene, a Doppler frequency of the pedestrian and a distance of the pedestrian from a border of a road, based in part on the respective data. The orientation angle is based on a heading of the pedestrian relative to a direction of a road. The command unit is configured to designate a status of the pedestrian as either crossing or not crossing based on the distance, the orientation angle and the Doppler frequency of the pedestrian.

The command unit may be adapted to change a vehicle trajectory and/or decelerate the vehicle based in part on the status of the pedestrian. The status is designated as crossing when: (1) the distance is less than a threshold distance; and (2) the orientation angle is less than a threshold angle; and (3) the Doppler frequency of the pedestrian is above a threshold frequency. The status is designated as not crossing otherwise.

In some embodiments, the orientation angle is between the heading of the pedestrian and a normal vector perpendicular to the direction of the road. The threshold frequency may be about 160 Hz and the threshold angle may be about 30 degrees. The command unit is adapted to segment the scene into a road portion and a non-road portion, with the direction and the border of the road being estimated based in part on the segmentation of the scene. The command unit is adapted to detect a location of the pedestrian in three-dimensions and generate a bounding box around the pedestrian in the scene. The orientation and the distance of the pedestrian may be estimated from a center of the bounding box.

In some embodiments, the sensors include a camera. The respective data from the camera may be used to segment the scene. A geographical map may be accessible to the command unit, with the command unit being adapted to employ information from the geographical map to segment the scene. The sensors may include a lidar unit. The respective data from the lidar unit may be employed to generate the bounding box around the pedestrian.

The command unit may be adapted to obtain a vehicle Doppler frequency based in part on the respective data from the radar unit and obtain an extracted frequency value at a center point of a bounding box surrounding the pedestrian in the scene. The command unit may be adapted to obtain the Doppler frequency of the pedestrian by subtracting the vehicle Doppler frequency from the extracted frequency value. The vehicle Doppler frequency is based in part on a carrier frequency of a signal from the radar unit, a speed of light and a speed of the vehicle.

Disclosed is a method of controlling operation of a vehicle in real-time, the vehicle having one or more sensors and a command unit with a processor and tangible, non-transitory memory. The method includes obtaining respective data of a scene, via the one or more sensors, and including a radar unit in the one or more sensors. An orientation angle of a pedestrian in the scene is determined based in part on the respective data. The orientation angle is based on a heading of the pedestrian relative to a direction of a road. The method includes determining a Doppler frequency of the pedestrian and a distance of the pedestrian from a border of the road based in part on the respective data and designating a status of the pedestrian in real-time as either crossing or not crossing based on the distance, the orientation angle and the Doppler frequency of the pedestrian.

The above features and advantages and other features and advantages of the present disclosure are readily apparent from the following detailed description of the best modes for carrying out the disclosure when taken in connection with the accompanying drawings.

DETAILED DESCRIPTION

Figure 1:
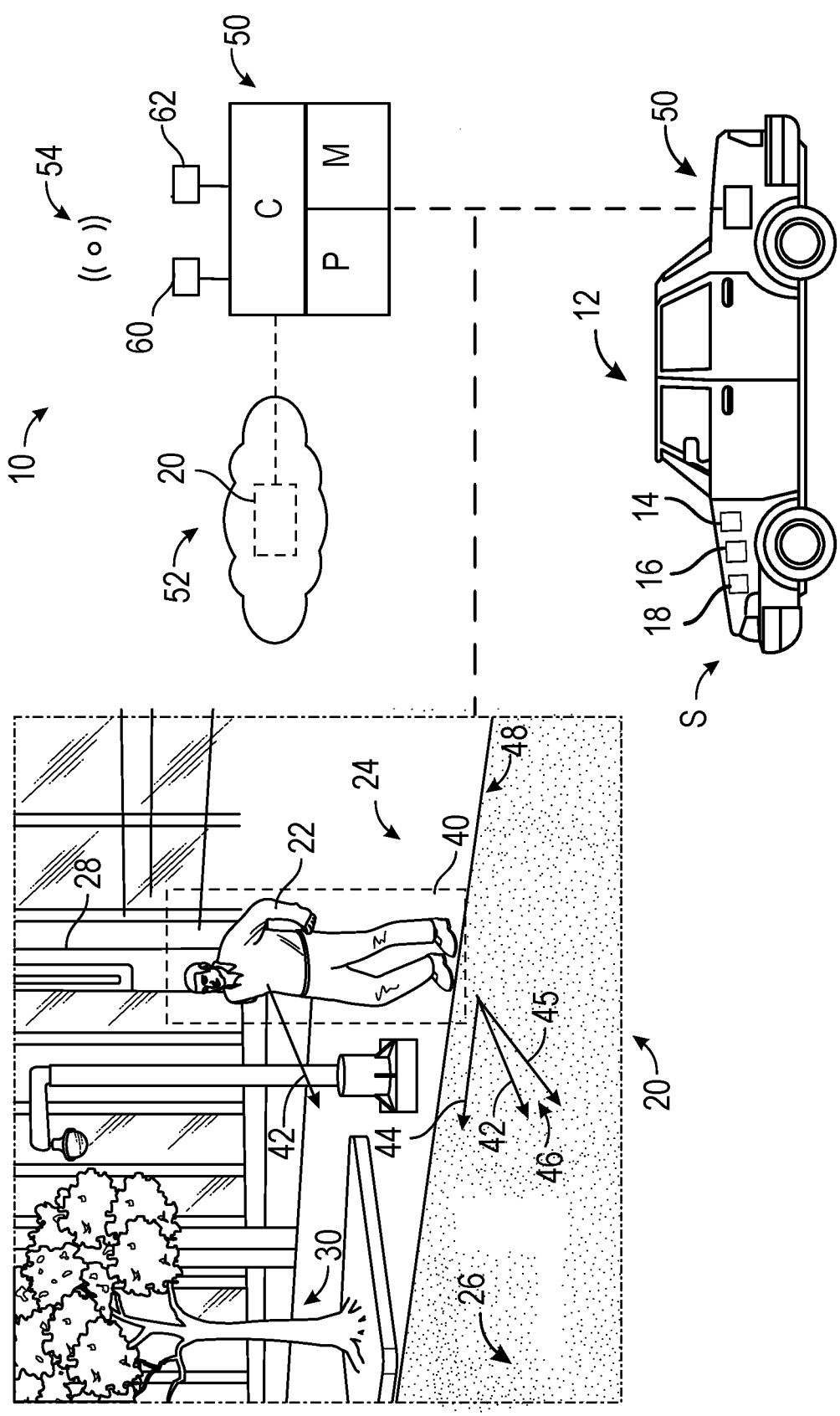
FIG. 1 is a schematic view of a system of controlling operation of a vehicle, the vehicle having a command unit and one or more sensors.

Referring to the drawings, wherein like reference numbers refer to like components, FIG. 1 schematically illustrates a system 10 of controlling operation of a vehicle 12. The vehicle 12 may be a mobile platform such as, but not limited to, a passenger car, sport utility car, light truck, heavy duty truck, ATV, minivan, bus, transit vehicle, bicycle, robot, farm implement (e.g., tractor), sports-related equipment (e.g., golf cart), boat, airplane and train. The vehicle 12 may take many different forms and include multiple and/or alternate components and facilities. It is to be understood that the vehicle 12 may take many different forms and have additional components.

Referring to FIG. 1, one or more sensors S are operatively connected to the vehicle 12. The sensors S may include a radar unit 14, a lidar unit 16 and a camera 18. The sensors S are configured to obtain respective data of a scene 20, an example of which is shown in FIG. 1. The scene 20 includes pedestrian 22 on a sidewalk 24 that is adjacent to or in proximity to a road 26. The example scene 20 includes a building 28 and a tree 30.

The system 10 includes a command unit 50 adapted to receive the respective data. The command unit 50 has a controller C, at least one processor P and at least one memory M (or non-transitory, tangible computer readable storage medium) on which instructions are recorded for executing method 100, shown in and described with respect to FIG. 2.

The issue being resolved is predicting whether the pedestrian 22 will cross the road 26 in the short-term future, e.g., within 1 or 2 seconds. As described below, the command unit 50 is configured to determine an orientation angle 46 of the pedestrian 22 in the scene 20, a Doppler frequency of the pedestrian 22 and a distance D of the pedestrian 22 from an edge or border 48 of the road 26, based in part on the respective data. The system 10 is adapted (via execution of method 100) to designate a status of the pedestrian 22 in the scene 20 as either crossing or not crossing the road 26 based on the distance, the orientation angle and the Doppler frequency of the pedestrian. Other example scenes 220, 320 having pedestrians 222, 322 are described below relative to FIGS. 3-4, respectively.

Referring to FIG. 1, the orientation angle 46 is based on a heading 42 of the pedestrian 22 relative to a direction 44 of the road 26. The orientation angle may be defined in various ways. Here, the orientation angle 46 is between the heading 42 of the pedestrian 22 and a normal vector 45 perpendicular to the direction 44, which is parallel to the direction of the road 26. The road 26 may be defined as a stretch of ground on which a vehicle may travel. The road 26 may be smoothed, semi-paved or paved. The road 26 may be an unpaved dirt road. The road 26 includes urban roads (e.g., interstate, collectors), rural roads, the driveway of a home or building or a parking lot. The road 26 may or may not have lines painted on it. The status of the pedestrian is beneficial for determining vehicle route and speed for an autonomous vehicle.

Referring to FIG. 1, the sensors S may be positioned such that their respective field of view substantially overlaps. The radar unit 14 includes antennas for transmitting electromagnetic waves in at least one of a radio and a microwave domain. The electromagnetic waves reflect off the various objects in the scene 20 and return to the radar unit 14, providing information about their location and speed. The radar unit 14 may employ phase-shifters to shift the phase of the electromagnetic waves to produce a phased-array beam. The radar unit 14 provides Doppler measurement, which is an instantaneous radial velocity measurement with relatively low latency and relatively high accuracy. In one example, the accuracy is about 0.1 meters per second.

The lidar unit 16 uses a laser source to target various objects in the scene 20 and measures the time for the reflected light to return. Lidar may employ visible, ultraviolet and near infrared electromagnetic radiation. The lidar unit 16 may include a microscopic array of individual antennas where the timing (phase) of each antenna is controlled to steer a cohesive signal in a specific direction. Other types of lidar or radar systems available to those skilled in the art may be employed.

The camera 18 provides image data of various targets in the scene 20 at various times. The image data may include a single visual image or a sequence of visual images. The camera 18 may include components available to those skilled in the art, such as for example, a lens, beam splitter, mirror, photomultiplier, dispersion devices, apertures, and modulators.

In one embodiment, the command unit 50 is embedded in the vehicle 12. In another embodiment, the command unit 50 is stored in an "off-board" or remotely located cloud computing service 52, shown in FIG. 1. The cloud computing service 52 may include one or more remote servers hosted on the Internet to store, manage, and process data. The cloud computing service 52 may be at least partially managed by personnel at various locations, such as at a "back office." The memory M can store command unit-executable instruction sets, and the processor P can execute the command unit-executable instruction sets stored in the memory M.

Communication between the various components of the vehicle 12 and the cloud unit 52 may occur through a wireless network 54. The wireless network 54 may be a short-range network or a long-range network. The wireless network 54 may be a communication BUS, which may be in the form of a serial Controller Area Network (CAN-BUS). The wireless network 54 may be a serial communication bus in the form of a local area network which may include, but is not limited to, a Controller Area Network (CAN), a Controller Area Network with Flexible Data Rate (CAN-FD), Ethernet, Bluetooth, WIFI and other forms of data. The wireless network 52 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or communication protocols available to those skilled in the art may be employed.

Figure 2:
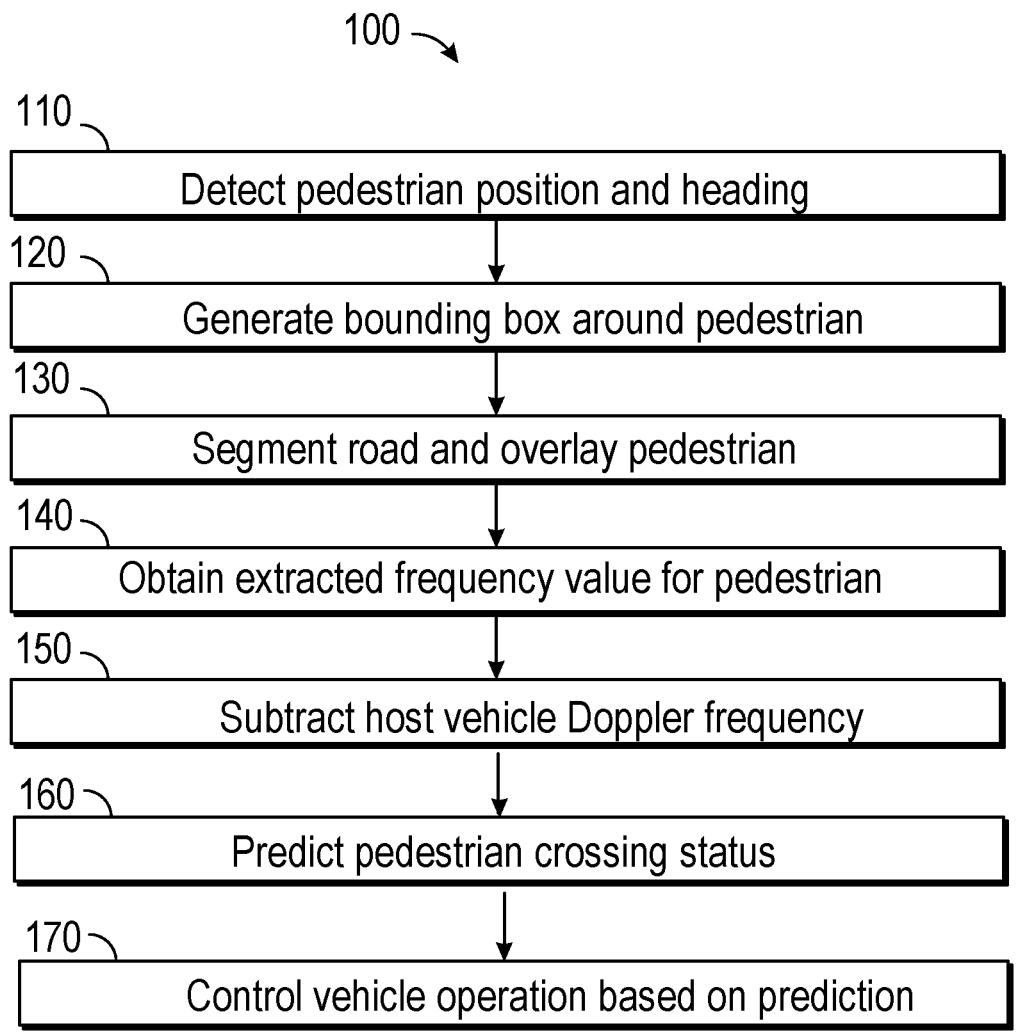
FIG. 2 is a schematic flow diagram for a method executable by the command unit of FIG. 1.

Referring now to FIG. 2, a flowchart of the method 100 is shown. Method 100 may be embodied as computer-readable code or instructions stored on and partially executable by the command unit 50 of FIG. 1. Method 100 need not be applied in the specific order recited herein. Furthermore, it is to be understood that some steps may be eliminated.

Per block 110 of FIG. 2, the command unit 50 is programmed to detect the location and heading 42 of the pedestrian 22 in three-dimensions. The respective data from the camera 18 and facial recognition technology may be employed to detect the location of the pedestrian 22. Alternatively, respective data from the lidar unit 16 may be used to capture the position and the heading of the pedestrian 22. The lidar unit 16 generally provides higher resolution than the radar unit 14. A three-dimensional object detection neural network may be used to detect the location of the pedestrian 22.

Per block 120 of FIG. 2, the method 100 includes generating a bounding box 40 around the pedestrian 22 in the scene 20 based on the respective data from the sensors S. The bounding box 40 covers the height, width and length of the pedestrian 22. In one example, the bounding box 40 is defined as the minimum or smallest bounding or enclosing box for a set of points defining the pedestrian 22 in three dimensions. In other words, the bounding box is the box with the smallest volume within which each of the points defining the pedestrian 22 lie. The command unit 50 may access a deep learning module or object detection neural network to generate the bounding box 40.

Per block 130 of FIG. 2, the command unit 50 is programmed to segment the scene 20 into a road portion (shown shaded in FIGS. 1 and 3-4) and a non-road portion. The segmentation may be done by dividing the pixels or voxels in the image of the scene 20 into road pixels and non-road pixels. In one embodiment, the segmentation is accomplished using the images/respective data from the camera 18. In another embodiment, the segmentation is accomplished using a map obtained from a reference source. For example, the map may be divided into a plurality of grid, with each grid being defined as either a road grid or a non-road grid. The segmentation of the image or map may be done using a neural network. The bounding box 40 is overlaid or displayed relative to the road portion of the scene 20. Also per block 130, the command unit 50 is programmed to calculate the distance D between the pedestrian 22 and a boundary or edge or border 48 of the road 26, shown in FIG. 1. The center of the bounding box 40 (using the height, width and length) may be taken as the position of the pedestrian 22.

Per block 140 of FIG. 2, the method 100 includes obtaining an extracted frequency value (F*) for the pedestrian 22. The extracted frequency value (F*) may be obtained by taking the Doppler with the maximum intensity value from a data-cube at the range and angle of the center of the bounding box 40 surrounding the pedestrian 22. The location of the extracted frequency value (F*) may be changed from the center-point of the bounding box 40. The radar unit provides the range and the center point angle (θ). The initiation of steps or walking by a pedestrian 22 may be detected with low latency by the radar unit 14. In other words, the Doppler frequency in the case of the pedestrian 22 starting to walk is significantly larger than in the case of the pedestrian 22 standing.

Per block 150 of FIG. 2, the command unit 50 is programmed to obtain the Doppler frequency of the vehicle 12 that is hosting the radar unit 14, (sometimes referred to as the host vehicle). The vehicle Doppler frequency ($F_V$) may be calculated as: $F_V = \{2*(F_C/c)*[\cos(\theta)*Vx + \sin(\theta)*Vy]\}$. Here, $F_C$ is the carrier frequency of the radar unit 14, c is the speed of light, θ represents the orientation of the radar unit 14, Vx is the velocity of the vehicle 12 in the x-direction, Vy is the velocity of the vehicle 12 in the y-direction (where x and y are the Cartesian coordinates with respect to the center point of the radar unit 14 in the vehicle 12). Also per block 150, the command unit 50 is programmed to obtain the Doppler frequency of the pedestrian 22 by subtracting the vehicle Doppler frequency from the extracted frequency value, as follows: $F_P = (F^* - F_V)$. Here, $F_P$ is the Doppler frequency of the pedestrian 22, $F_V$ is the vehicle Doppler frequency and F* is the extracted frequency value.

Per block 160 of FIG. 2, the command unit 50 is programmed to designate a status of the pedestrian 22 in real-time as either crossing or not crossing based on the distance D, the orientation angle 46 and the Doppler frequency of the pedestrian 22. In a non-limiting example, the threshold distance is set to be about 30 cm. The threshold Doppler value may be set to 160 Hz and the threshold angle may be set to be about 30 degrees.

Referring to FIG. 1, the pedestrian 22 is positioned within threshold distance of the road 26 and the pedestrian Doppler frequency is greater than the threshold frequency Doppler. The pedestrian 22 is heading toward the road 26 as the orientation angle 46 between the normal vector 45 (perpendicular to the road direction 44) and the heading 42 is relatively small (approximately 10 degrees here, which is less than the threshold angle). Since each of the conditions is met, the command unit 50 will designate the status of the pedestrian 22 as crossing.

Figure 3:
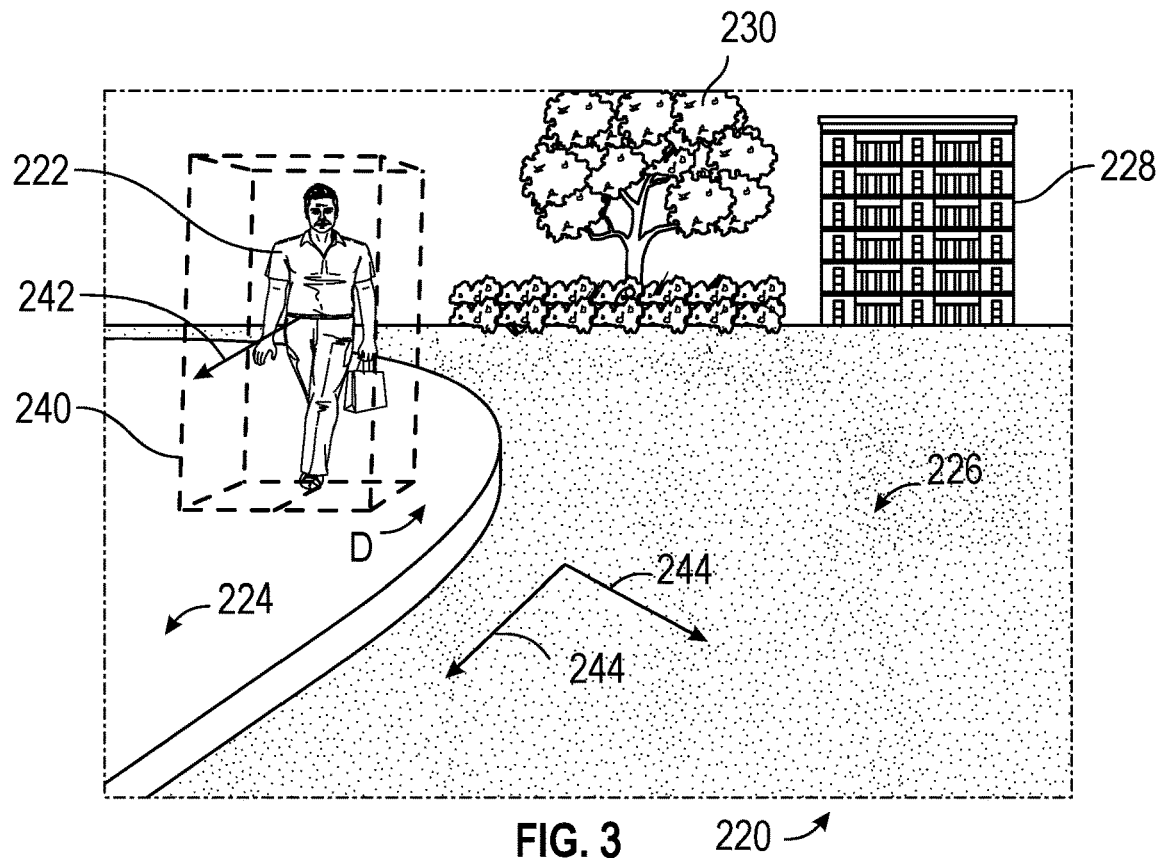
FIG. 3 is a schematic perspective view of an example scene with pedestrian.

FIG. 3 is a schematic perspective view of another example scene 220 with a pedestrian 222 standing on a sidewalk 224 that is in proximity to a road 226 (shown shaded). The example scene 220 includes a building 228 and vegetation 230. Also shown in FIG. 3 is a bounding box 240 around the pedestrian 222 and the heading 242 of the pedestrian 222. Here, the pedestrian Doppler frequency is greater than the threshold frequency Doppler as the pedestrian 222 is walking and the pedestrian 222 (at distance D) is positioned within threshold distance of the road 226. However, the pedestrian 222 is not heading toward the road 226 as the orientation angle between the normal vector 245 (perpendicular to the road direction 244) and the heading 242 is relatively large (approximately 90 degrees here, which is greater than the threshold angle). Thus, the command unit 50 will designate the status of the pedestrian 222 as not crossing.

Figure 4:
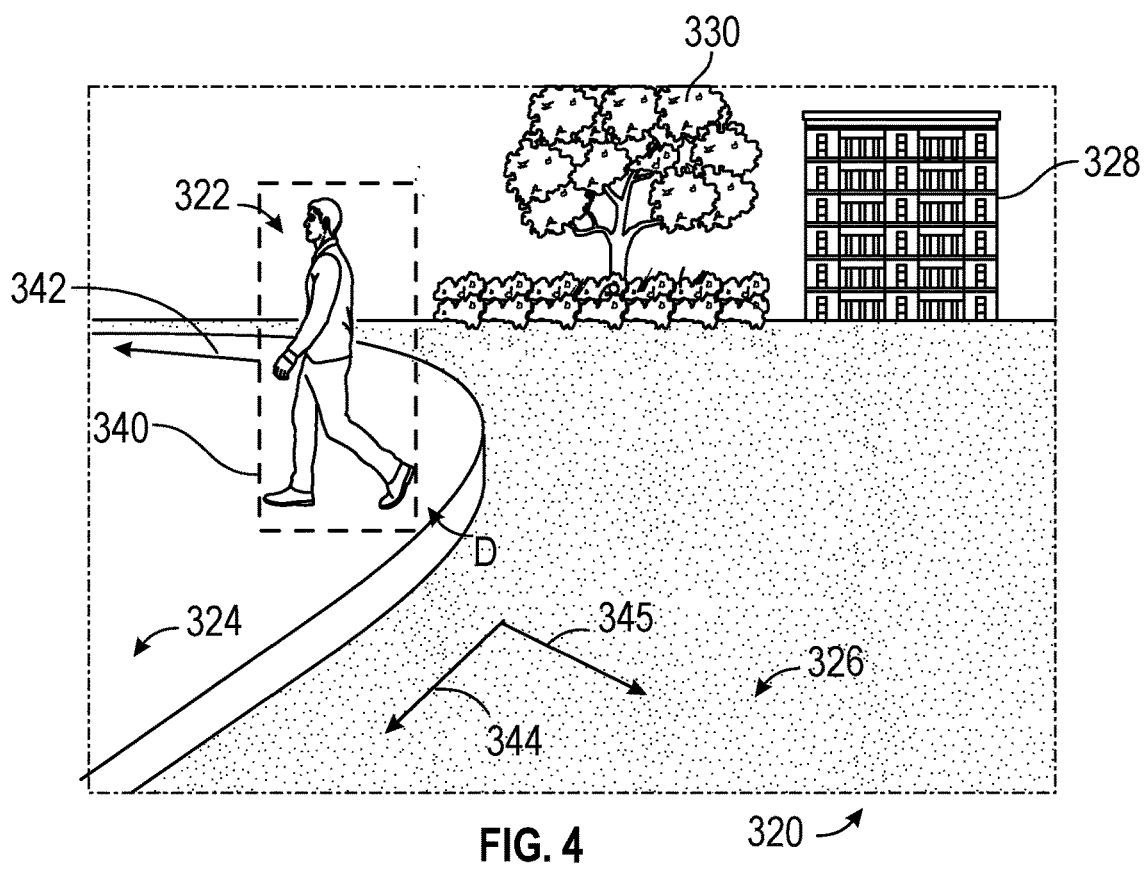
FIG. 4 is a schematic perspective view of another example scene with a pedestrian.

FIG. 4 is a schematic perspective view of yet another example scene 320 with a pedestrian 322 walking on a sidewalk 324 that is in proximity to a road 326 (shown shaded). The example scene 320 includes a building 328 and vegetation 330. Also shown in FIG. 4 is a bounding box 340 around the pedestrian 322, the heading 342 of the pedestrian 322 and a road direction 344. Referring to FIG. 4, the pedestrian 322 is positioned (at distance D) within threshold distance of the road 326 and the pedestrian Doppler frequency is greater than the threshold frequency Doppler. However, the pedestrian 222 is not heading toward the road 326 as the orientation angle between the normal vector 345 (perpendicular to the road direction 344) and the heading 342 is relatively large (approximately 180 degrees here, which is greater than the threshold angle). Thus, the command unit 50 will designate the status of the pedestrian 322 as not crossing.

Proceeding to block 170, the command unit 50 is configured to control operation of the vehicle 12 based on the predicted pedestrian crossing status. The command unit 50 may be adapted to change a trajectory of the vehicle 12 and/or decelerate the vehicle 12 based in part on the status of the pedestrian. For example, the vehicle 12 may include an automatic braking module 60 that is selectively activated to reduce motion or decelerate the vehicle 12 when the status is designated as crossing. The vehicle 12 may include a lane change assist module 62 that is selectively activated to assist the vehicle 12 in changing lanes when the status is designated as crossing.

In summary, the system 10 predicts whether a pedestrian 22 will be crossing the road 26 by detecting speed of the pedestrian with low latency from Doppler measurements of the radar unit 14. The system obtains 3D location and heading of a pedestrian 22 with indication of proximity to the road 26. Road crossing is predicted when the pedestrian 22 is relatively close to the road 26 with heading towards the road 26 and an instantaneous speed is detected from the radar unit 14 with low latency. The results provide guidance for the vehicle 12 to reduce its speed, change its direction or other measures.

The command unit 50 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system of controlling operation of a vehicle, the system comprising:
   one or more sensors operatively connected to the vehicle and configured to obtain respective data of a scene, the one or more sensors including a radar unit;
   a command unit adapted to receive the respective data, the command unit including a processor and tangible, non-transitory memory on which instructions are recorded;
   wherein the command unit is configured to:
      determine an orientation angle of a pedestrian in the scene based in part on the respective data, the orientation angle being based on a heading of the pedestrian relative to a direction of a road;
      determine a Doppler frequency of the pedestrian and a distance of the pedestrian from a border of the road based in part on the respective data; and
      designate a status of the pedestrian as either crossing or not crossing based on the distance, the orientation angle and the Doppler frequency of the pedestrian.

2. The system of claim 1, wherein the command unit is adapted to change a vehicle trajectory and/or decelerate the vehicle based in part on the status of the pedestrian.

3. The system of claim 1, wherein:
   the status is designated as crossing when the distance is less than a threshold distance and the orientation angle is less than a threshold angle and the Doppler frequency of the pedestrian is above a threshold frequency; and
   the status is designated as not crossing otherwise.

4. The system of claim 3, wherein the orientation angle is between the heading of the pedestrian and a normal vector perpendicular to the direction of the road.

5. The system of claim 3, wherein the threshold frequency is about 160 Hz and the threshold angle is about 30 degrees.

6. The system of claim 1, wherein the command unit is adapted to:
   segment the scene into a road portion and a non-road portion, the direction and the border of the road being estimated based in part on the segmentation of the scene;
   detect a location of the pedestrian in three-dimensions; and
   generate a bounding box around the pedestrian in the scene, the orientation and the distance of the pedestrian being estimated from a center of the bounding box.

7. The system of claim 6, wherein the one or more sensors include a camera and the respective data from the camera is used to segment the scene.

8. The system of claim 6, further comprising:
   a geographical map accessible to the command unit, the command unit being adapted to employ information from the geographical map to segment the scene.

9. The system of claim 6, wherein the one or more sensors include a lidar unit and the respective data from the lidar unit is employed to generate the bounding box around the pedestrian.

10. The system of claim 1, wherein the command unit is adapted to:
    obtain a vehicle Doppler frequency based in part on the respective data from the radar unit;
    obtain an extracted frequency value at a center point of a bounding box surrounding the pedestrian in the scene; and
    obtain the Doppler frequency of the pedestrian by subtracting the vehicle Doppler frequency from the extracted frequency value.

11. The system of claim 10, wherein the vehicle Doppler frequency is based in part on a carrier frequency of a signal from the radar unit, a speed of light and a speed of the vehicle.

12. A method of controlling operation of a vehicle in real-time, the vehicle having one or more sensors and a command unit with a processor and tangible, non-transitory memory, the method comprising:
    obtaining respective data of a scene, via the one or more sensors, and including a radar unit in the one or more sensors;
    determining an orientation angle of a pedestrian in the scene based in part on the respective data, the orientation angle being based on a heading of the pedestrian relative to a direction of a road;
    determining a Doppler frequency of the pedestrian and a distance of the pedestrian from a border of the road based in part on the respective data; and
    designating a status of the pedestrian as either crossing or not crossing based on the distance, the orientation angle and the Doppler frequency of the pedestrian.

13. The method of claim 12, further comprising:
    changing a vehicle trajectory and/or decelerating the vehicle based in part on the status of the pedestrian.

14. The method of claim 12, further comprising:
    designating the status as crossing when the distance is less than a threshold distance and the orientation angle is less than a threshold angle and the Doppler frequency of the pedestrian is above a threshold frequency; and
    designating the status as not crossing otherwise.

15. The method of claim 12, further comprising:
segmenting the scene into a road portion and a non-road portion;
detecting a location of the pedestrian in three-dimensions; and
generating a bounding box around the pedestrian in the scene.

16. The method of claim 15, further comprising:
including a camera in the one or more sensors; and
using the respective data from the camera to segment the scene.

17. The method of claim 15, further comprising:
including a lidar unit in the one or more sensors; and
using the respective data from the lidar unit to generate the bounding box around the pedestrian.

18. The method of claim 15, further comprising:
obtaining a vehicle Doppler frequency based in part on the respective data from the radar unit;
obtaining an extracted frequency value at a center point of a bounding box surrounding the pedestrian in the scene; and
obtaining the Doppler frequency of the pedestrian by subtracting the vehicle Doppler frequency from the extracted frequency value.

19. A system of controlling operation of a vehicle, the system comprising:
one or more sensors operatively connected to the vehicle and configured to obtain respective data, the one or more sensors including a radar unit, a camera and a lidar unit;
a command unit adapted to receive the respective data, the command unit including a processor and tangible, non-transitory memory on which instructions are recorded;
wherein the command unit is configured to determine an orientation angle of a pedestrian based in part on the respective data, the orientation angle being between a heading of the pedestrian and a normal vector perpendicular to a direction of a road;
wherein the command unit is configured to determine a Doppler frequency of the pedestrian and a distance of the pedestrian from a border of the road based in part on the respective data; and
wherein the command unit is configured to determine a status of the pedestrian in real-time as either crossing or not crossing, the status being crossing when the distance is less than a threshold distance, the orientation angle is less than a threshold angle and the Doppler frequency of the pedestrian is above a threshold frequency.

20. The system of claim 19, wherein the command unit is adapted to:
segment the scene into a road portion and a non-road portion, via the respective data from the camera;
detect a location of the pedestrian in three-dimensions; and
generate a bounding box around the pedestrian in the scene, via the respective data from the lidar unit.

* * * * *